US012320329B2

(12) United States Patent
Mukherjee

(10) Patent No.: US 12,320,329 B2
(45) Date of Patent: Jun. 3, 2025

(54) WIND TURBINE ROTOR BLADE WITH A LEADING EDGE MEMBER

(71) Applicant: BLADE DYNAMICS LIMITED, Eastleigh (GB)

(72) Inventor: Manish Mukherjee, Eastleigh (GB)

(73) Assignee: BLADE DYNAMICS LIMITED, Eastleigh (GB)

( * ) Notice: Subject to any disclaimer, the term of this patent is extended or adjusted under 35 U.S.C. 154(b) by 23 days.

(21) Appl. No.: 18/025,701

(22) PCT Filed: Oct. 22, 2021

(86) PCT No.: PCT/EP2021/079340
§ 371 (c)(1),
(2) Date: Mar. 10, 2023

(87) PCT Pub. No.: WO2022/084506
PCT Pub. Date: Apr. 28, 2022

(65) Prior Publication Data

US 2023/0358207 A1 Nov. 9, 2023

(30) Foreign Application Priority Data

Oct. 23, 2020 (GB) .................................... 2016823

(51) Int. Cl.
*F03D 1/06* (2006.01)

(52) U.S. Cl.
CPC ........ *F03D 1/0688* (2023.08); *F05B 2230/23* (2013.01); *F05B 2240/303* (2020.08);
(Continued)

(58) Field of Classification Search
CPC .... F03D 1/0668; F03D 1/0675; F03D 1/0643; F03D 80/30; F03D 80/40; F03D 80/401; F05B 2280/2004; F05B 2280/4003; F05B 2280/4004; F05B 2280/5006; F05B 2280/6003; F05B 2230/23; F05B 2240/303; F05B 2240/304; F05B 2240/85
See application file for complete search history.

(56) References Cited

U.S. PATENT DOCUMENTS

2011/0142678 A1* 6/2011 Santiago ............... F03D 1/0675
416/241 R
2017/0314532 A1* 11/2017 Kirkegaard ............. C08J 5/124
(Continued)

FOREIGN PATENT DOCUMENTS

CA 2996124 A1 2/2017
DE 102008006427 A1 7/2008
(Continued)

*Primary Examiner* — Courtney D Heinle
*Assistant Examiner* — Ryan C Clark
(74) *Attorney, Agent, or Firm* — Nath, Goldberg & Meyer; Jerald L. Meyer; Tanya E. Harkins

(57) ABSTRACT

A wind turbine rotor blade (10) is provided with a lightning protection device (84) and a leading edge member (70), the leading edge member (70) comprising an erosion shield (78, 80), deicing means, and an electrically conductive outer surface (80) which is operatively connected to the lightning protection device (84). The invention also relates to the use of the leading edge member (70) for providing leading edge erosion protection, ice mitigation and lightning protection of a wind turbine rotor blade.

11 Claims, 5 Drawing Sheets

Figure 1:
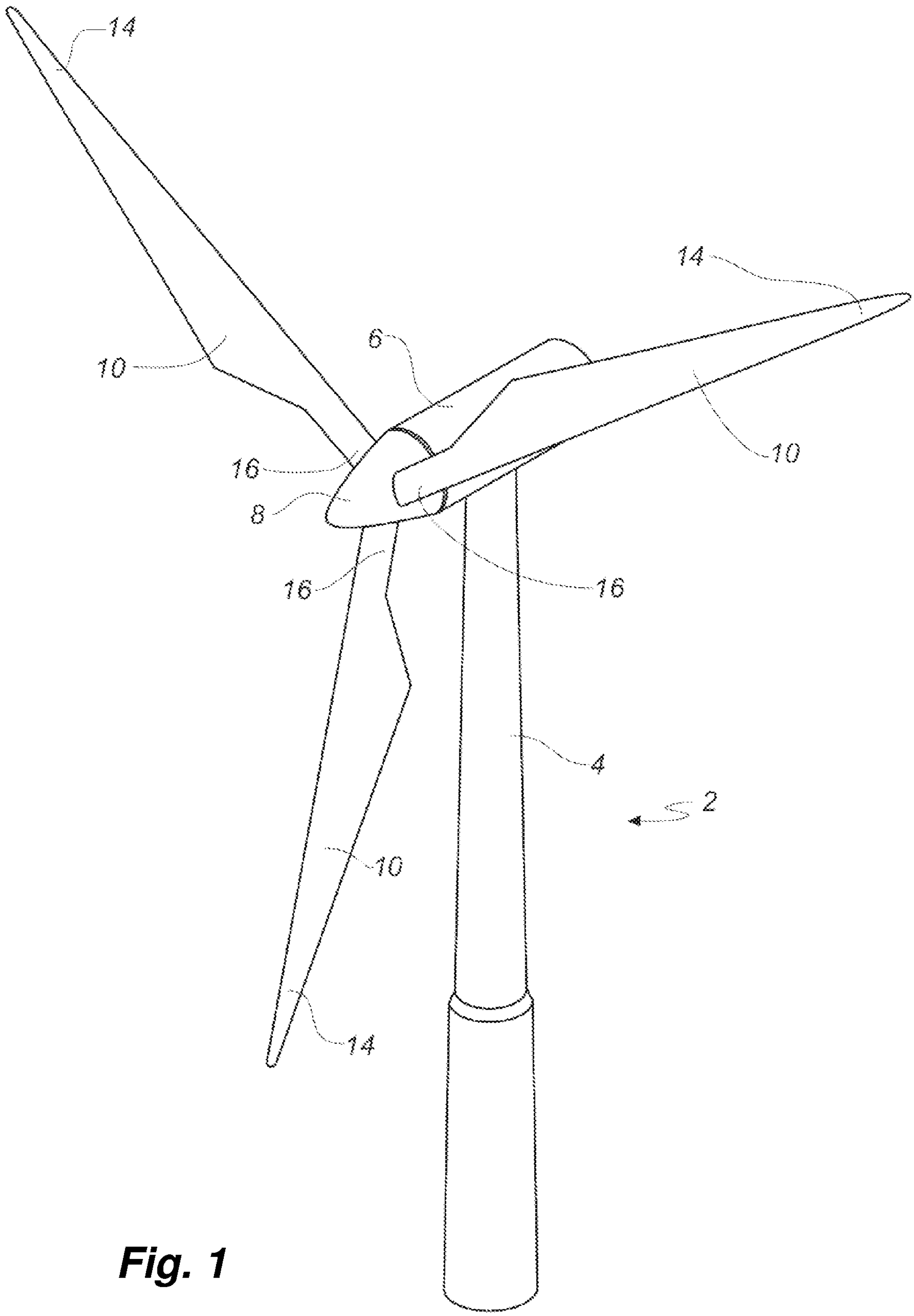

(52) U.S. Cl.
CPC . *F05B 2240/304* (2020.08); *F05B 2280/2004* (2013.01); *F05B 2280/4003* (2013.01)

(56) References Cited

U.S. PATENT DOCUMENTS

| | | | | |
|---|---|---|---|---|
| 2019/0003462 | A1* | 1/2019 | Nielsen | F03D 1/0675 |
| 2019/0264659 | A1* | 8/2019 | Qi | F03D 80/40 |
| 2020/0047215 | A1 | 2/2020 | Pachai et al. | |
| 2020/0355164 | A1* | 11/2020 | Christiansen | F03D 80/30 |
| 2021/0207576 | A1* | 7/2021 | Larsen | F03D 80/50 |
| 2021/0262350 | A1* | 8/2021 | Mathew | F03D 80/30 |
| 2022/0258430 | A1* | 8/2022 | Kimiaeifar | B29C 66/038 |

FOREIGN PATENT DOCUMENTS

| | | | | |
|---|---|---|---|---|
| DE | 102015113763 | A1 | 2/2017 | |
| EP | 2826993 | A1 | 1/2015 | |
| EP | 3653748 | A1 * | 5/2020 | C23C 28/00 |
| WO | 2011087414 | A1 | 7/2011 | |
| WO | WO-2012046031 | A1 * | 4/2012 | C09D 5/24 |
| WO | WO-2017012632 | A1 * | 1/2017 | B32B 27/08 |
| WO | 2018059763 | A1 | 4/2018 | |
| WO | 2019103831 | A2 | 5/2019 | |

* cited by examiner

WIND TURBINE ROTOR BLADE WITH A LEADING EDGE MEMBER

This is a National Phase Application filed under 35 U.S.C. 371 as a national stage of PCT/EP2021/079340, filed Oct. 22, 2021, an application claiming the benefit of Great Britain Application No. 2016823.3, filed Oct. 23, 2020, the content of each of which is hereby incorporated by reference in its entirety.

FIELD OF THE INVENTION

The present invention relates to a wind turbine rotor blade with a leading edge member, and to the use of a leading edge member of the present invention for providing leading edge erosion protection, ice mitigation and lightning protection of a wind turbine rotor blade.

BACKGROUND OF THE INVENTION

Wind is an increasingly popular clean source of renewable energy with no air or water pollution. When the wind blows, wind turbine rotor blades spin clockwise, capturing energy through a main shaft connected to a gearbox and a generator for producing electricity. Rotor blades of modern wind turbines are carefully designed to maximise efficiency. Modern rotor blades may exceed 80 metres in length and 4 metres in width.

Wind turbine rotor blades are typically made from a fibre-reinforced polymer material, comprising a pressure side shell half and a suction side shell half, also called blade halves. The cross-sectional profile of a typical blade includes an airfoil for creating an air flow leading to a pressure difference between both sides. The resulting lift force generates torque for producing electricity.

As wind turbines increase in size, so do blade lengths, often resulting in faster tip speeds. This increases the risk of eroded leading edges due to the continued impact from wind, rain, hail, sand and/or airborne particles, potentially causing material to be removed from the blade surface, resulting in a rough profile that impacts the aerodynamic performance and the structural integrity of the blade. Such erosive processes can limit the maximum rotational speed of the rotor blades, hence potentially reducing the power output of the wind turbine. These effects are exacerbated by the fact that wind turbines are increasingly subjected to harsh environmental conditions, such as at remote offshore sites, mountain regions or challenging climates.

Leading edge erosion may therefore result in reduced annual energy production and increased need for maintenance and repairs. For reducing damage caused by erosion, some prior art solutions attempt to protect the leading edge of a wind turbine blade using a special paint coating or a protective layer of thermoplastic film. Such coatings can be applied in-mould or post-mould. However, typically the protection provided by painted coatings tends to diminish over time. Also, polymer films may be difficult to apply and/or to bond to the blade surface.

Another known way of addressing these challenges is the implementation of metallic leading edges such as ceramic or polymer caps. Some of these installations, however, lead to an undesired increase in the mass of the blade tip, thus increasing loads on the rest of the blade and on the turbine. In addition, as the size of the rotor blades increases, the size of the protective device must also increase. Such large and thick devices tend to be particularly susceptible to cracking due to mechanical impact and vibrations during the operation of the wind turbine. Thus, existing protection solutions are susceptible to defects and poor adhesion, potentially raising operation and maintenance cost substantially.

Furthermore, lightning discharges may penetrate into the interior of the wind turbine rotor blade, resulting in serious damages to the blade and any attached surface members. As wind turbine blades are usually fabricated from fibre-reinforced composites, i.e. non-conducting materials, a blade taking a direct lightning strike cannot easily absorb and transfer the resulting electrical energy, thus typically resulting in severe damage.

Another challenge when operating wind turbines in colder climates is the formation of ice on the rotor blades. Due to ice formation the blades may crack and the production efficiency may drastically decrease. The wear of the wind turbine blade including its leading edge may also increase due to mass and aerodynamic imbalances and resulting friction caused by the ice.

It is therefore a first object of the present invention to provide a leading edge protection solution that is easily and cost-effectively applicable to a wind turbine blade.

It is a further object of the present invention to provide a leading edge protection solution that addresses one or more of the above-mentioned challenges.

It is another object of the present invention to provide a leading edge protection which leads to extended lifetimes of wind turbine blades, prevents damage to the blade and which reduces the frequency of repairs.

It is another object of the present invention to provide a wind turbine blade with fewer components and having a simpler design.

SUMMARY OF THE INVENTION

The present invention addresses one or more of the above-discussed objects by providing a wind turbine rotor blade having a pressure side, a suction side, a leading edge, and a trailing edge extending between a tip and a root, wherein the rotor blade comprises a lightning protection device and a leading edge member, the leading edge member comprising

- an erosion shield, preferably a leading edge erosion shield,
- deicing means, such as an electrical heating element, and
- an electrically conductive outer surface which is operatively connected to the lightning protection device.

It was found that this combination of features enables a wind turbine to be efficiently operated under optimal conditions at various wind speeds, weather conditions and seasons. The present invention thus combines ice mitigation, leading edge erosion protection and lightning protection of the wind turbine blade by virtue of the leading edge member, which can be integrated into the blade. In case of a severe lightning strike or repeat lightning strike, which causes damage to the leading edge member, the leading edge member can be easily replaced with a new one, the connections with the rest of electrical circuit can be completed, and the blade can be restored to its full functionality.

The leading edge member is preferably provided along at least part of the leading edge of the blade, such as along 10-60%, preferably 20-50%, of the spanwise extent of the leading edge of the blade. In a preferred embodiment, the leading edge member comprises a leading edge cap, such as an erosion resistant leading edge cap. In another preferred embodiment, the leading edge member is an erosion shield.

According to a particularly preferred embodiment, the chordwise width of the leading edge member, preferably the chordwise width on the suction side of the blade, decreases stepwise towards the tip end of the blade. Preferably, the protection member comprises at least one discrete step, such as a stepwise or discrete decrease, in its chordwise width when moving in a spanwise direction towards the tip end of the blade. As used herein, the chordwise width of the leading edge member is the chordwise distance between one of the longitudinally extending, usually linear, edges of the protection member and the leading edge of the blade. In some embodiments, the chordwise width of the leading edge member is substantially the same on both sides of the blade, i.e. both on the suction side and on the pressure side of the blade. "Chordwise" means extending along a chord of the blade, i.e. transversally, and "spanwise" means extending along the span of the blade, i.e. longitudinally.

Preferably, the deicing means comprise an electrical heating element. In preferred embodiments, the deicing means are either metal resistive elements, for example copper, or composite resistive elements, for example carbon elements. In some embodiments, the deicing means comprise a series of resistive elements spaced apart from adjacent elements by a distance sufficient to provide electrical insulation. In some embodiments the entire outer surface of the leading edge member serves as a resistive element for heating and ice mitigation. In a preferred embodiment, the deicing means comprise one or more heating mats for generating heat mounted at or below an outer surface of the blade, the one or more heating mats being connectable to a respective power terminal for supplying power to the heating mat.

In some embodiments, the leading edge member comprises a resistive heating layer at or below its outer surface as deicing means. The resistive heating layer may extend along substantially the entire spanwise length and chordwise width of the leading edge member. In one embodiment, the electrically conductive outer surface of the leading edge member which is operatively connected to the lightning protection device is the outer surface of the resistive heating layer.

The heating element or resistive heating layer may comprise a metal material, such as copper, such as a copper mat. In other embodiments, the heating element or resistive heating layer may comprise a carbon fibre material, such as a carbon fibre mat. Carbon fibres are comparatively robust, such that the risk of damage caused by a lightning strike can be lowered. The heating element or resistive heating layer may be formed by one or more of the outer surfaces of the leading edge member. In some embodiments, the heating element is electrically coupled to an electrical power supplying conductor. In one embodiment, the heating element may be substantially planar and have a substantially rectangular or elliptical shape. The heating element may take the form of a sheet disposed within one or more surfaces of the leading edge member. The leading edge member may also comprise a heating thread, which can be integrated in the fabric of the leading edge member of at least part of its length.

The lightning protection device advantageously protects the rotor blade and wind turbine from lightning strikes. In a preferred embodiment, the lightning protection device comprises a lightning conductor, such as a cable, for example a copper cable. The lightning protection device may be disposed at least partially in the interior of the rotor blade. For example, the lightning protection device may extend in the interior through at least a portion of the length of the rotor blade. In a preferred embodiment, the lightning protection device is connected at various locations along the length of the rotor blade to one or more electrically conducting lightning receptors disposed on one or more of the surfaces of the rotor blade, preferably on one or more surfaces of the leading edge member. The leading edge member of the present invention may replace or supplement such lightning receptors. The lightning protection device may further be in conductive communication with a grounding system in the wind turbine, such as in the tower of the wind turbine.

The lightning protection device, such as the lightning conductor, is preferably connected to any electrically conducting surfaces, such as metal layers or plates, on the outer surface of the leading edge member, via one or more cables for establishing equipotential bonding between the lightning conductor and the electrically conductive surfaces of the leading edge member.

When the leading edge member of the present invention and the lightning protection device are operatively connected, the lightning protection device may protect the rotor blade from lightning strikes. The electrical current from lightning striking the electrically conductive surface of the leading edge member of the present invention may flow through the leading edge member to the lightning protection device. In a preferred embodiment, a conduction cable or a plurality of conduction cables operatively connect the leading edge member to the lightning protection device. The conduction cable is preferably connected at one end to the conductive surface of the leading edge member and at the other end to the lightning protection device. Electrical current from lightning strikes to the leading edge member may flow from the leading edge member through the conduction cable to the lightning protection device, and through the lightning protection device to the ground, thereby preventing damage to the rotor blade and the wind turbine.

The leading edge member may be rigid or semi-flexible. In some embodiments, the leading edge member comprises a thermoplastic material. In other embodiments, the leading edge member is manufactured from extruded sheets of a thermoplastic. In another embodiment, the leading edge member comprises a polyurethane softshell. According to an alternative embodiment, the leading edge member is a metallic shield, preferably comprising stainless steel, nickel and/or titanium.

In some embodiments, the leading edge member comprises a polyurethane material. The leading edge member may also comprise one or more components for the prevention of fouling during operation of the rotor blade. In some embodiments, a portion of the outer shell surface of the rotor blade is recessed such that the shell defines a recessed area extending across the leading edge, the leading edge member being received within the recessed area.

In a preferred embodiment, the rotor blade is a segmented rotor blade comprising a tip end segment and a root end segment. In such embodiments, it is preferred that the leading edge member is coupled to, or embedded within, the tip end segment. Preferably, each segment comprising a pressure side shell member and a suction side shell member. In some embodiments, the root end segment constitutes 30-80%, such as 40-70%, of the entire longitudinal extent of the blade. In some embodiments, the tip end segment constitutes 10-50%, such as 20-40%, of the entire longitudinal extent of the blade.

In one embodiment, the leading edge member comprise a plurality of layers of erosion resistant material, said plurality of layers being arranged in a stack from an outermost layer substantially forming said external surface to an innermost layer arranged to be attached to a leading edge of a wind turbine blade, said plurality of layers bonded to adjacent layers in the stack. In a preferred embodiment, the plurality of layers of erosion resistant material have a cohesive strength or tensile strength greater than the adhesive strength or bond strength between adjacent or subsequent layers, such that at least a section of an outermost exposed layer will delaminate or peel from said leading edge member under the action of wind when at least a portion of said section of said outermost exposed layer has been eroded or ruptured, to present a relatively smooth external surface of said leading edge member.

In a preferred embodiment, the leading edge member is mounted to an attachment surface of the rotor blade by a snap-fit connection. To this end, the leading edge member may contain one or more snap-fit members, such as one or more rails or bushings, that can snap onto one or more edges or cavities of the rotor blades. In another preferred embodiment, the leading edge member is mounted to the attachment surface of the rotor blade by a clip-on interlocking connection. In a preferred embodiment, the leading edge member is mounted to the attachment surface of the rotor blade in a snap-clip arrangement.

Also, the leading edge member is preferably configured for protecting the outermost part of the blade leading edge next to or including the blade tip, as the blade tip and the outermost part of the wind turbine blade are exposed to particles of higher velocities and thereby have a higher risk of erosion damage. In a particularly preferred embodiment, the leading edge member extends along the outermost 5-50% of the length of the leading edge such as the outermost 10-30%.

In other embodiments, the thickness of the leading edge member may decrease, e.g. by chamfering, towards any or all of its edges, preferably at least towards its longitudinally extending edges, for advantageously providing a smooth transition to the adjacent blade surface.

In a preferred embodiment, the leading edge member comprises a substantially arcuate or U-shaped cross-section. Typically, the leading edge member comprises a first and a second longitudinally extending edge, and an outer and an inner arcuate surface extending between the first and the second longitudinally extending edge. The first and second longitudinally extending edges are preferably substantially straight edges. Preferably, the first longitudinally extending edge is attached to the suction side of the wind turbine blade, whereas the second longitudinally extending edge is attached to the pressure side of the wind turbine blade. In some embodiments, one or both of the longitudinally extending edges of the leading edge member have a stepped profile with a discreet step towards the leading edge when moving towards the blade tip in a spanwise direction.

The outer and inner surfaces of the leading edge member are typically arcuate or substantially U-shaped. In a preferred embodiment, the inner surface of the leading edge member is complementary to an attachment surface of the rotor blade shell. Typically, the leading edge member also comprises opposing lateral edges, which are likewise arcuate or substantially U-shaped. In a preferred embodiment, the outer surface of the leading edge member extends across the leading edge such that the leading edge member covers at least part of both the suction side surface and the pressure side surface of the wind turbine blade.

In a preferred embodiment, the leading edge member comprises a polymer material and/or a ceramic material. In a preferred embodiment, the leading edge member comprises a plurality of layers of erosion resistant material. In a particularly preferred embodiment, the leading edge member comprises one or more metal film layers, which at least partly form the electrically conductive surface of the leading edge member.

It is preferred that the deicing means comprise one or more electrical heating elements, such as one or more resistive heating elements. In a preferred embodiment, the resistive heating element comprises a metal film layer, a metallic alloy, a ceramic materials, and/or a ceramic metal. In a preferred embodiment, an electrical current passes through at least part of the leading edge member for generating heat in said part of the leading edge member.

In a preferred embodiment, the leading edge member comprises a polymer material and/or a ceramic material. In a preferred embodiment, the leading edge member comprises a plurality of layers of erosion resistant material. In some embodiments, the leading edge members comprises a metallic plate or metallic layer throughout its outer surface.

In a preferred embodiment, the leading edge member comprises a first region extending in a spanwise direction and a second region adjacent to the first region and extending in a spanwise direction, wherein the second region is closer to the blade tip than the first region, wherein the boundary between the first and second region extends in a substantially chordwise direction. It is particularly preferred that the first region differs from the second region in at least one property selected from the respective material composition and the respective thickness of the region. It is thus preferred that the first region is composed of a different material than the second region. In some embodiments, the outer surface of the second region is configured to act as lightning receptor, for example by arranging one or more layers of metallic material within said outer surface. It is preferred that the outer surface of the first region is configured to act as erosion shield and preferably as an ice-mitigating surface.

In a preferred embodiment, the first region comprises at least one outer layer of a metallic material. In other embodiments, the first region is composed of one or more metallic materials. In another preferred embodiment, the second region of the leading edge member comprises, or is composed of, a polymer material and/or a ceramic material, wherein the polymer material and/or ceramic material comprises an integrated metal material. In some embodiments, one or more heating mats are placed adjacent to the first region, closer to the trailing edge than the first region, the one or more heating mats extending in a substantially spanwise direction. The one or more heating mats may be electrically heatable heating mats which are fixed to the outer surface or below the outer surface of the rotor blade, for example one or more silicone mats with a heating element.

In a preferred embodiment, the leading edge member further comprises a third region extending in a spanwise direction adjacent to the first region, wherein the boundary between the first and third region extends in a substantially spanwise direction, wherein the third region is closer to the trailing edge than the first region. It is particularly preferred that the third region differs from the first and/or second region in at least one property selected from the respective material composition and the respective thickness of the region. It is thus preferred that the third region is composed of a different material than the first and/or the second region. It is preferred that the outer surface of the third region is configured to act as an ice-mitigating surface, preferably by arranging one or more heating elements in or beneath said outer surface.

It is preferred that the edge erosion shield of the leading edge member is formed by the first and second regions of the leading edge member. According to a particularly preferred embodiment, the chordwise width of the leading edge member decreases in at least one discreet step towards the tip end of the blade, wherein the first region and the third region together form a first zone with a first chordwise width, and wherein the second region forms a second zone with a second chordwise width, the first chordwise width exceeding the second chordwise width. Preferably, a discrete step, such as a stepwise or discrete decrease, of chordwise width is provided between the first and the second zone, when moving in a spanwise direction towards the tip end of the blade.

It is preferred that the leading edge member is embedded in the blade such that all outer surfaces of the leading edge member are substantially flush with the adjacent outer shell surface of the wind turbine rotor blade. In a preferred embodiment, the leading edge member is manufactured during a shell moulding operation of the wind turbine blade, i.e. in an in-mould operation, wherein the shell moulding operation comprises co-infusing, typically with a resin, a fibre material forming at least part of the shell of the rotor blade and one or more layers forming the leading edge member. A vacuum is typically used to draw epoxy resin material into the mould for the co-infusion process. In some embodiments, the leading edge member may be moulded in a mould comprising a moulding surface configured for forming the outer surface of the leading edge member, and preferably the surrounding shell surface. In some embodiments, the wind turbine blade is a segmented blade with a tip end segment and a root end segment, wherein the tip end segment is moulded using said mould. The leading edge member may be laid up covering a first part of the moulding surface of the mould. The leading edge member may be oriented such that the outer surface of the leading edge member faces the moulding surface of the mould.

In some embodiments, the leading edge member is formed by first laying a metal film layer onto the moulding surface, followed by one or more additional layers, such as a rubber layer. These layers may be bonded to each other by vulcanization of the rubber layer, which creates strong bonding between the two layers. Before bonding the metal film layer and the rubber layer, the metal film layer may be chemically treated to remove any oxide layers, in order to provide a better film bonding surface for the rubber layer. Alternatively, the metal film layer and the rubber layer may be bonded with an adhesive. In such embodiments, the metal film layer forms the outer surface of the leading edge member and the rubber layer forms the inner surface of the leading edge member. In some embodiments, first a blade gel coat or primer is applied to the mould.

In a preferred embodiment, the first region, the second region and the third region of the leading edge member, as discussed above, are moulded with the afore-mentioned method. In some embodiments, the first and the second region of the leading edge member, as discussed above, are moulded with the afore-mentioned method, whereas the third region is applied to the shell surface in a post-moulding operation. In a preferred embodiment, the leading edge member is part of a tip end segment of a segmented wind turbine blade, the tip end segment accounting for 5-40% of the total length of the wind turbine blade, wherein the tip end segment is manufactured according to the above-described method including the embedded leading edge member.

In a preferred embodiment, the leading edge member extends in a substantially spanwise direction over 10-50% of the total blade length, preferably over 10-40% of the total blade length, most preferably over 20-40% of the total blade length.

In one embodiment, the electrical heating element and the lightning protection device are operably connected to a joint control unit. In a preferred embodiment, the leading edge member comprises a film layer comprising a metal material and a polymer layer, the film layer being bonded on top of the polymer layer, wherein the film layer forms part of the outer surface of the leading edge member. In a preferred embodiment, the polymer layer is a rubber layer. In a preferred embodiment, the metal material comprises nickel-based alloy, titanium, stainless steel, shape-memory-alloy and/or aluminium.

In a preferred embodiment, the thickness of the metal film layer is less than 0.8 mm, such as less than 0.5 mm, such as between 0.1-0.4 mm. In a preferred embodiment, the width of the leading edge member in the transverse direction is between 40-500 mm, e.g. between 50-400 mm, e.g. between 50-100 mm. In a preferred embodiment, the length of the leading edge member is between 10-100 m, such as between 15-70 m In a preferred embodiment, the leading edge member is mounted to the rotor blade by a snap-fit or by a clip-on interlocking connection. In a preferred embodiment, the leading edge member extends along part of the leading edge of the rotor blade. Typically, the leading edge member comprises a substantially U-shaped or arcuate cross-section.

In another aspect, the present invention relates to the use of a leading edge member of the present invention for providing leading edge erosion protection, ice mitigation and lightning protection of a wind turbine rotor blade during its operation.

In another aspect, the present invention relates to a method of manufacturing a wind turbine rotor blade, more preferably a tip end segment thereof, wherein the leading edge member of the present invention is embedded in the shell of the rotor blade in a shell moulding operation comprises co-infusing, typically with a resin, a fibre material forming at least part of the shell of the rotor blade and one or more layers forming the leading edge member. Preferably, the leading edge member is moulded in a mould comprising a moulding surface configured for forming the outer surface of the leading edge member as well as the surrounding shell surface of the rotor blade segment. In some embodiments, the wind turbine blade is a segmented blade with a tip end segment and a root end segment, wherein the tip end segment is moulded using said mould. The leading edge member may be laid up covering a first part of the moulding surface of the mould. The leading edge member may be oriented such that the outer surface of the leading edge member faces the moulding surface of the mould. In some embodiments, the leading edge member is formed by first laying a metal film layer onto the moulding surface, followed by one or more additional layers, such as a rubber layer. These layers may be bonded to each other by vulcanization of the rubber layer, which creates strong bonding between the two layers. Before bonding the metal film layer and the rubber layer, the metal film layer may be chemically treated to remove any oxide layers, in order to provide a better film bonding surface for the rubber layer. Alternatively, the metal film layer and the rubber layer may be bonded with an adhesive. In such embodiments, the metal film layer forms the outer surface of the leading edge member and the rubber layer forms the inner surface of the leading edge member.

Such method advantageously ensures that the leading edge member is embedded in the blade and safely attached to the same, such that all outer surfaces of the leading edge member are substantially flush with the adjacent outer shell surface of the wind turbine rotor blade. Also, the method of the present invention avoids bond lines, such as bond lines between two shell halves, at the leading edge of the blade.

It will be understood that any of the above-described features or embodiments pertain to each of the different aspects of the present invention, such as the wind turbine blade, the use of the present invention, or the method of manufacturing a wind turbine rotor blade according to the present invention. In particular, features and embodiments described with regard to the rotor blade may also apply to the use or to the method of the present invention, and vice versa.

DETAILED DESCRIPTION OF THE INVENTION

Figure 2:
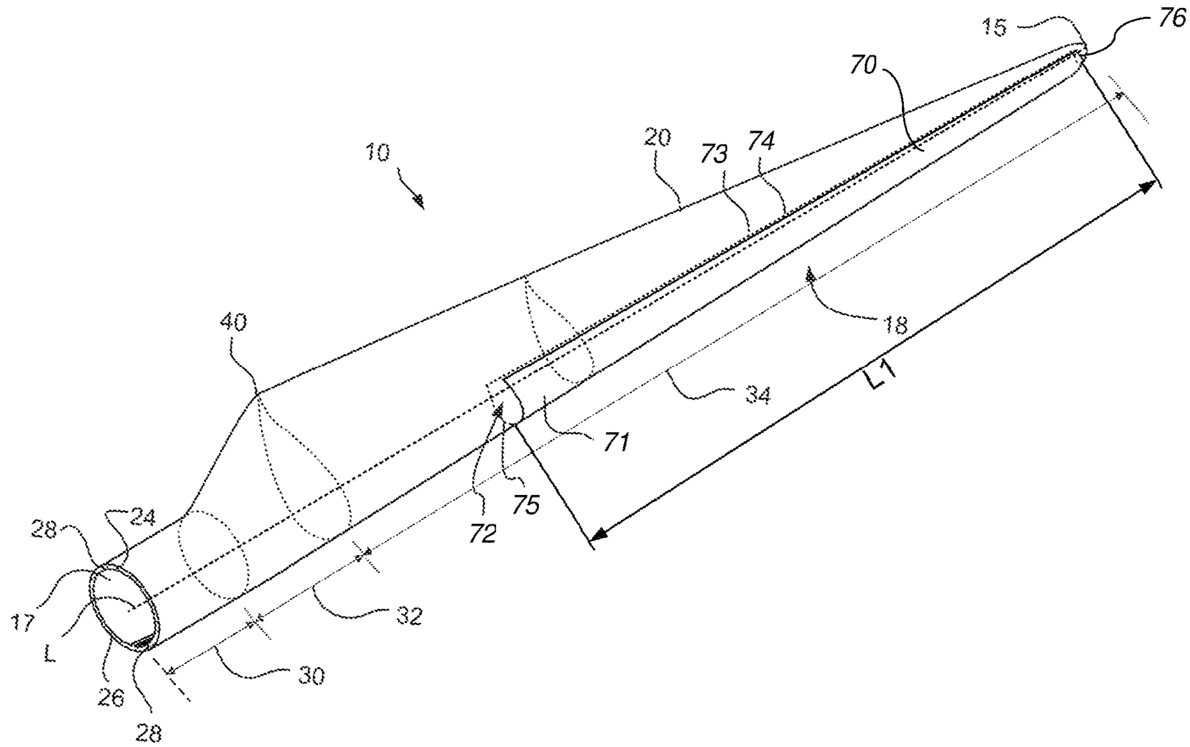
Figure 3:
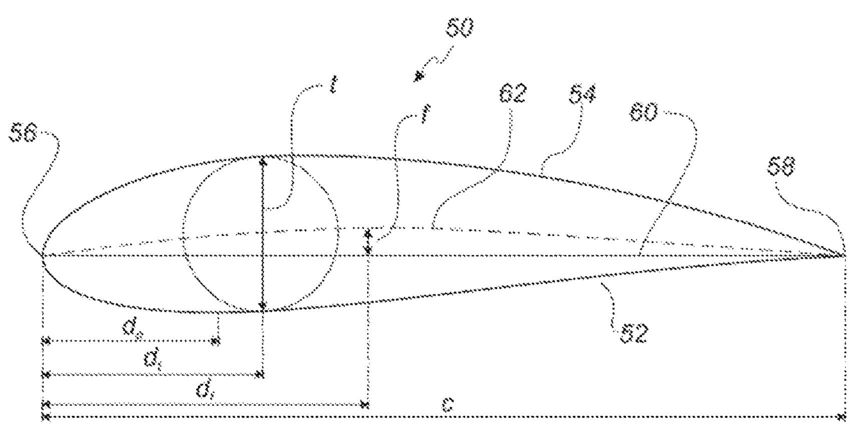
Figure 4:
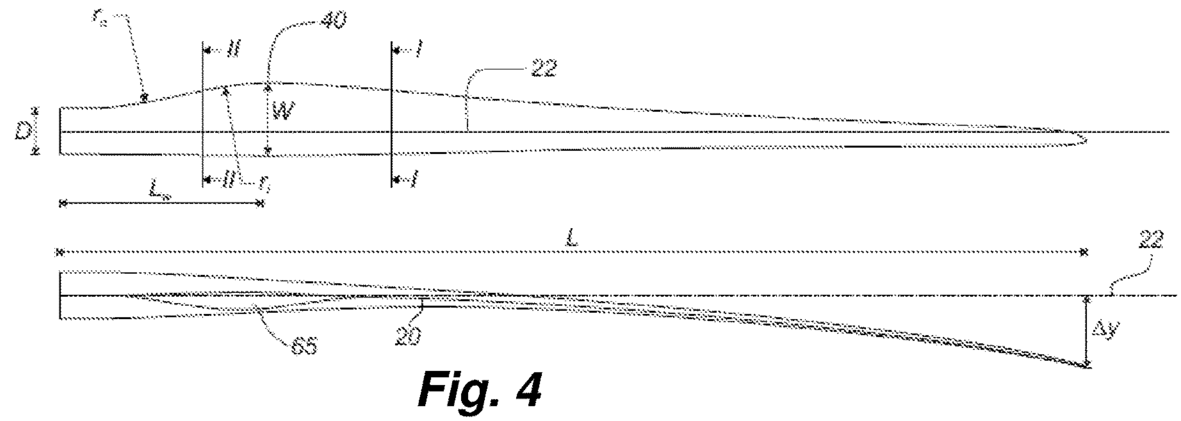
Figure 5A:
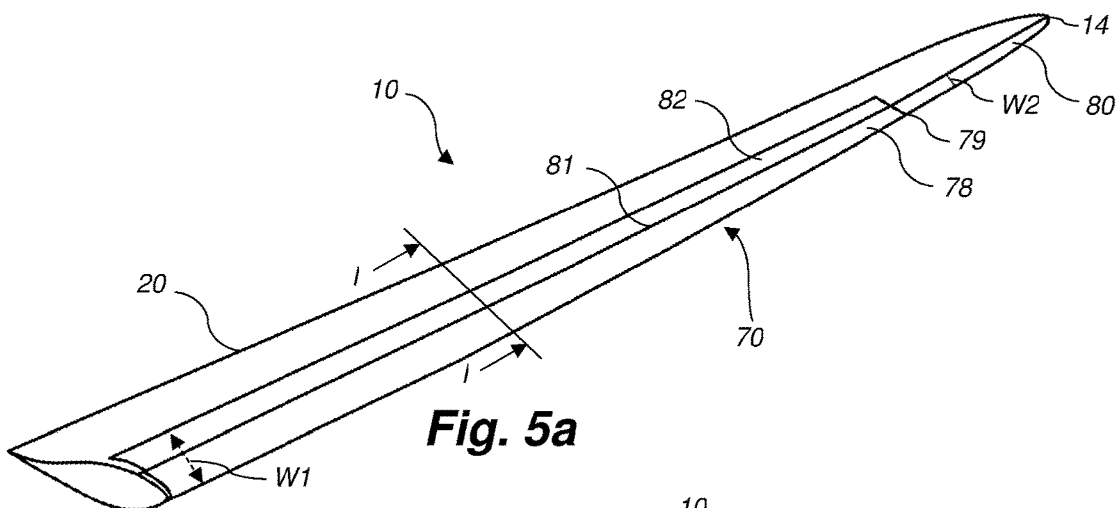
Figure 5B:
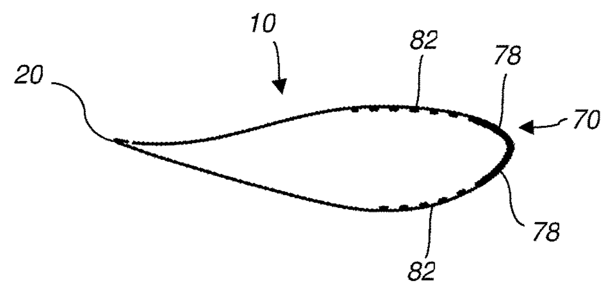
Figure 6:
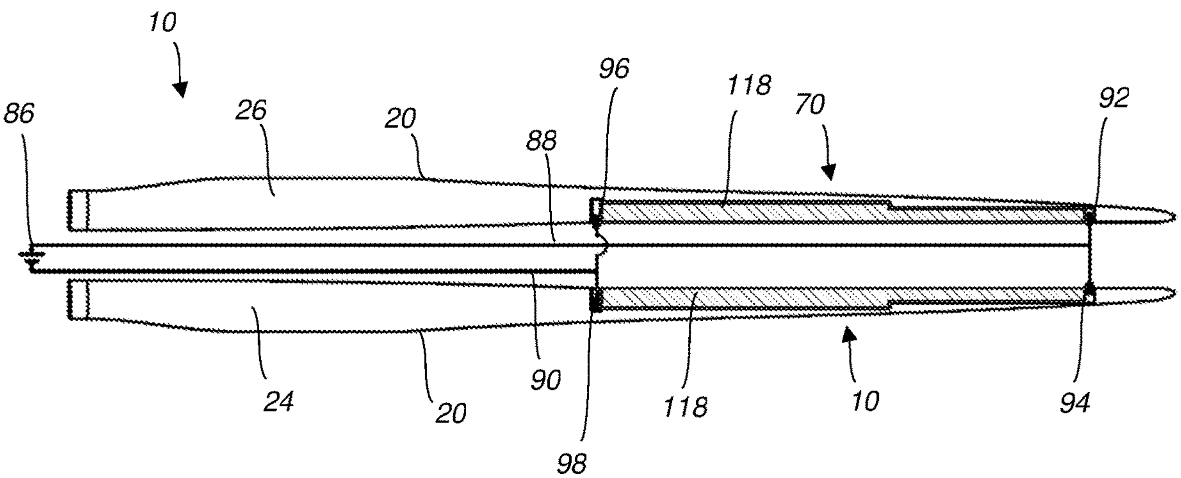
Figure 7:
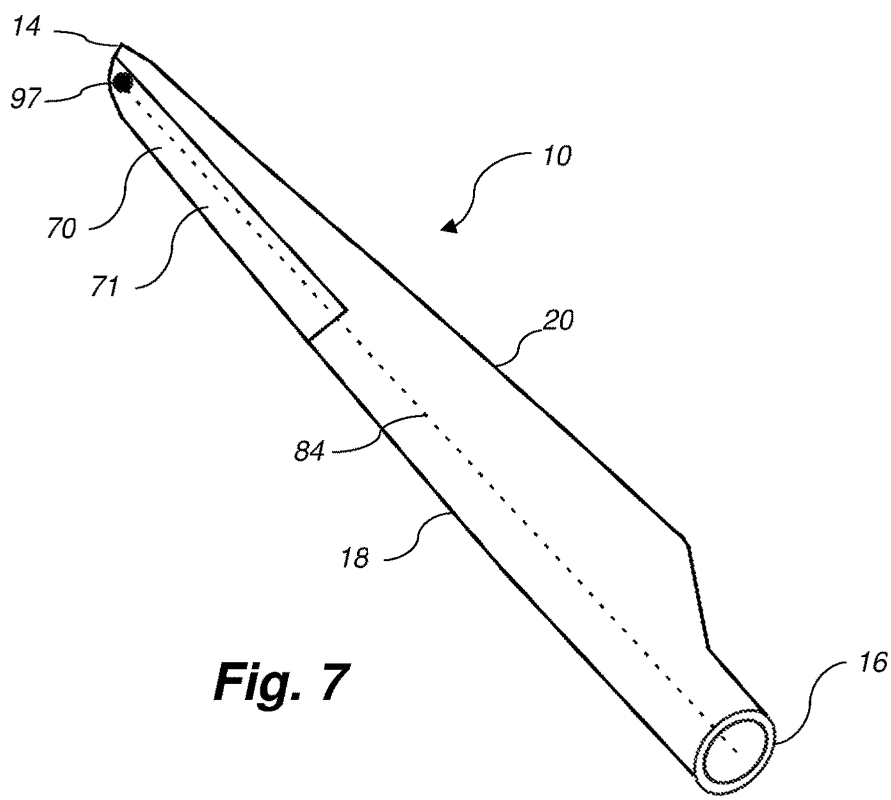
Figure 8:
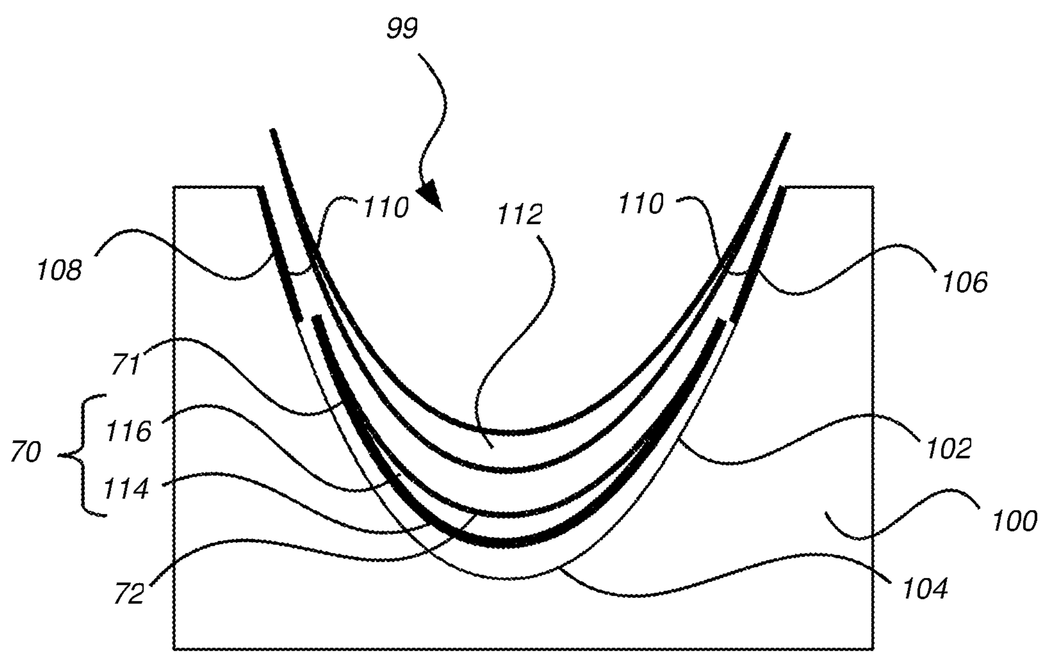

The invention is explained in detail below with reference to embodiments shown in the drawings, in which corresponding components are identified by the same reference numerals, wherein FIG. 1 shows a wind turbine, FIG. 2 shows a schematic view of a wind turbine blade, FIG. 3 shows a schematic view of an airfoil profile through section I-I of FIG. 4, FIG. 4 shows a schematic view of the wind turbine blade, seen from above and from the side, FIG. 5*a* is a partial perspective view of a wind turbine blade with a leading edge member according to one embodiment of the present invention, FIG. 5*b* is a schematic cross sectional view taken along the line I-I in FIG. 5*a*, FIG. 6 is a schematic top view and simplified circuit diagram of two blade halves according to one of embodiment of the present invention, FIG. 7 is a schematic perspective view of a wind turbine blade according to one embodiment of the present invention, and FIG. 8 illustrates a moulding system for manufacturing at least part of wind turbine blade of the present invention.

DETAILED DESCRIPTION

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8.

FIG. 2 shows a schematic view of an exemplary wind turbine blade 10. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 comprises a blade shell comprising two blade shell parts or half shells, a first blade shell part 24 and a second blade shell part 26, typically made of fibre-reinforced polymer. The wind turbine blade 10 may comprise additional shell parts, such as a third shell part and/or a fourth shell part. The first blade shell part 24 is typically a pressure side or upwind blade shell part. The second blade shell part 26 is typically a suction side or downwind blade shell part. The first blade shell part 24 and the second blade shell part 26 are fastened together with adhesive, such as glue, along bond lines or glue joints 28 extending along the trailing edge 20 and the leading edge 18 of the blade 10. Typically, the root ends of the blade shell parts 24, 26 has a semi-circular or semi-oval outer cross-sectional shape.

The wind turbine blade 10 comprises a leading edge member 70 on the leading edge 18 of the wind turbine blade 10. The leading edge member 70 extends in a spanwise direction between a first lateral edge 75 and a second lateral edge 76. The leading edge member 70 also has a first longitudinally extending edge 73 and a second longitudinally extending edge 74. The longitudinal direction of the leading edge member 70 may be parallel to the longitudinal direction of the wind turbine blade 10. The length L1 of the leading edge member, e.g. the distance between the first lateral edge 75 and the second lateral edge 76, may be the same as the length of the leading edge 18 of the wind turbine blade 10. The length L1 may be smaller than the length of the leading edge 18 of the wind turbine blade 10, as illustrated. The leading edge member 70 has an outer surface 71 and an inner surface 72. The inner surface 72 of the leading edge member faces the leading edge 18 of the wind turbine blade.

FIGS. 3 and 4 depict parameters which are used to explain the geometry of the wind turbine blade. FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber (or suction side camber) and lower camber (or pressure side camber), which are defined as the distances from the chord 60 and the suction side 54 and pressure side 52, respectively.

Airfoil profiles are often characterised by the following parameters: the chord length c, the maximum camber f, the position $d_f$ of the maximum camber f, the maximum airfoil thickness t, which is the largest diameter of the inscribed circles along the median camber line 62, the position $d_t$ of the maximum thickness t, and a nose radius (not shown). These parameters are typically defined as ratios to the chord length c. Thus, a local relative blade thickness t/c is given as the ratio between the local maximum thickness t and the local chord length c. Further, the position $d_p$ of the maximum pressure side camber may be used as a design parameter, and of course also the position of the maximum suction side camber.

FIG. 4 shows other geometric parameters of the blade. The blade has a total blade length L. As shown in FIG. 3, the root end is located at position r=0, and the tip end located at r=L. The shoulder 40 of the blade is located at a position $r=L_w$, and has a shoulder width W, which equals the chord length at the shoulder 40. The diameter of the root is defined as D. The curvature of the trailing edge of the blade in the transition region may be defined by two parameters, viz. a minimum outer curvature radius $r_o$ and a minimum inner curvature radius $r_i$, which are defined as the minimum curvature radius of the trailing edge, seen from the outside (or behind the trailing edge), and the minimum curvature radius, seen from the inside (or in front of the trailing edge), respectively. Further, the blade is provided with a prebend, which is defined as Δy, which corresponds to the out of plane deflection from a pitch axis 22 of the blade.

FIG. **5*a* is a partial perspective view of a wind turbine blade 10 with a leading edge member 70 according to one embodiment of the present invention, whereas FIG. 5*b* is a schematic cross sectional view taken along the line I-I in FIG. 5*a*. In the illustrated embodiment, the leading edge member 70 comprises a first region 78 extending in a spanwise direction and a second region 80 adjacent to the first region and extending in a spanwise direction. The second region 80 is closer to the blade tip 14 than the first region 78. The boundary 79 between the first and second region extends in a substantially chordwise direction. The first region 78 is preferably composed of a different material than the second region 80. The edge erosion shield of the leading edge member 70 is formed by the first and second regions 78, 80**.

In addition, the leading edge member 70 of FIG. 5 comprises a third region 82 extending in a spanwise direction adjacent to the first region 78. The boundary 81 between the first and the third region extends in a substantially spanwise direction, wherein the third region 82 is closer to the trailing edge 20 than the first region 78. The first, second and third regions 78, 80, 82 may form an electrical heating element as further illustrated below. Also, at least the second region 80 may form the electrically conductive outer surface 80 which is operatively connected to the lightning protection device. Each of the first, second and third regions 78, 80, 82 may comprise one or more metal film layers at their outer surface, which at least partly form the electrically conductive surface of the leading edge member.

Thus, as seen in FIG. 5, the chordwise width W1 of the leading edge member 70 decreases towards the tip end 14 in a discrete step, i.e. to chordwise width W2.

FIG. 6 is a schematic top view and simplified circuit diagram of two blade halves according to one embodiment of the present invention, wherein at least part of the surface of the leading edge member forms the deicing means in the form of a resistive heating layer 118 placed at, or just below, the outer surface of the leading edge member 70. To that end, the resistive heating layer 118 of the leading edge member may comprise a metal film layer, a metallic alloy, a ceramic materials, and/or a ceramic metal. The leading edge member 70 extends in a substantially spanwise direction over about 40% of the total blade length in the illustrated embodiment. The resistive heating layer 118, or part thereof may act as a resistive heating element for ice mitigation by connecting a power supply 86 via lines 88, 90 to various contact points 92, 94, 96, 98 on both sides of the resistive heating layer 118.

FIG. 7 illustrates schematically that an electrically conductive outer surface 71 of the leading edge member 70 is operatively connected to lightning protection device 84 comprising a cable, such as a copper cable. The lightning protection device 84 is disposed at least partially in the interior of the rotor blade. The lightning protection device 84 may be connected to a tip end lightning receptor 97, which in turn is electrically connected to the electrically conductive outer surface 71 of the leading edge member 70. In other embodiments, the electrically conductive outer surface 71 of the leading edge member 70 may be connected directly to eh lightning protection device 84. The electrical heating element and the lightning protection device can be operably connected to a joint control unit.

FIG. 8 is a schematic diagram illustrating a moulding system 99 with a mould 100 for manufacturing a leading edge member 70 and a shell of a wind turbine blade. The mould 100 comprises a moulding surface 102 configured for forming the outer surface 71 of the leading edge member. The leading edge member 70 is laid up on a first part 104 of the moulding surface 102 of the mould, e.g. by orienting the leading edge member 70 such that the outer surface 71 of the leading edge member faces the moulding surface 82 of the mould. As a first layer forming the leading edge member a film layer 114, for example a metal film layer, may be laid onto the moulding surface 102. As a second layer, a polymer layer 116, for example a rubber layer, may be laid onto the film layer 114. A shell material 112, such as fibre reinforced material, is then laid in the mould 80 covering the inner surface 72 of the leading edge member 70, which is formed by the polymer layer 116 in the illustrated embodiment. The shell material 112 may be a sheet of material, such as glass fibre. The shell material 112 may be laid up such that the shell material 112 covers a second part 106 and/or a third part 108 of the moulding surface 102 of the mould 100. A coating 110 may be applied to the second part 106 of the moulding surface and/or the third part 108 of the moulding surface. The shell material 112 and the leading edge member 70 is then consolidated, e.g. by co-infusing the shell material 112 and the leading edge member 70 with a resin and curing the resin, to form at least part of the wind turbine blade. Vacuum assisted resin transfer moulding (VARTM) may be applied.

The invention is not limited to the embodiments described herein and may be modified or adapted without departing from the scope of the present invention.

LIST OF REFERENCE NUMERALS

2 wind turbine
4 tower
6 nacelle
8 hub
10 blade
14 blade tip
16 blade root
18 leading edge
20 trailing edge
22 pitch axis
24 first blade shell part (pressure side)
26 second blade shell part (suction side)
28 bond lines/glue joints
30 root region
32 transition region
34 airfoil region
40 shoulder/position of maximum chord
50 airfoil profile
52 pressure side
54 suction side
56 leading edge
58 trailing edge
60 chord
62 median camber line
70 leading edge member
71 outer surface of leading edge member
72 inner surface of leading edge member
73 first longitudinally extending edge of leading edge member
74 second longitudinally extending edge of leading edge member
75 first lateral edge of leading edge member
76 second lateral edge of leading edge member
78 first region of leading edge member
79 boundary between first and second region
80 second region of leading edge member
81 boundary between first and third region
82 third region of leading edge member
84 lightning protection device
86 power source
88 first line
90 second line
92 first contact
94 second contact
96 third contact
97 tip end lightning receptor
98 fourth contact
99 moulding system
100 mould
102 moulding surface
104 first part of moulding surface
106 second part of moulding surface
108 third part of moulding surface
110 coating
112 shell material
114 film layer
116 polymer layer
118 resistive heating layer
c chord length
$d_t$ position of maximum thickness
$d_f$ position of maximum camber
$d_p$ position of maximum pressure side camber
f camber
L blade length
r local radius, radial distance from blade root
t thickness
Δy prebend

The invention claimed is:

1. A wind turbine rotor blade (10) having a pressure side, a suction side, a leading edge, and a trailing edge extending between a tip and a root, wherein the wind turbine rotor blade comprises a lightning protection device (84) and a leading edge member (70), the leading edge member (70) comprising:

an erosion shield (78, 80);

deicing means (118); and an electrically conductive outer surface (80) which is operatively connected to the lightning protection device (84), wherein the leading edge member (70) has a first region (78) extending in a spanwise direction and a second region (80) adjacent to the first region and extending in the spanwise direction, wherein the second region (80) is closer to the tip than the first region (78), wherein a boundary (79) between the first region (78) and the second region (80) extends in a chordwise direction, wherein the first region (78) is composed of a different material than the second region (80), and wherein the leading edge member (70) comprises a film layer comprising a metal material and a polymer layer, the film layer being bonded on top of the polymer layer, wherein the film layer forms part of the electrically conductive outer surface of the leading edge member (70).

2. The wind turbine rotor blade according to claim 1, wherein the leading edge member (70) comprises one or more metal film layers, which at least partly form an electrically conductive surface of the leading edge member (70).

3. The wind turbine rotor blade according to claim 1, wherein the leading edge member (70) is manufactured during a shell moulding operation of the wind turbine rotor blade, wherein the shell moulding operation comprises co-infusing a fibre material forming at least part of the shell of the rotor blade and one or more layers forming the leading edge member.

4. The wind turbine rotor blade according to claim 1, wherein the leading edge member is embedded in the wind turbine rotor blade.

5. The wind turbine blade according to claim 1, wherein the deicing means comprises a resistive heating element comprising a metal film layer, a metallic alloy, a ceramic material, and/or a ceramic metal.

6. The wind turbine rotor blade according to claim 1, wherein the leading edge member (70) comprises a polymer material and/or a ceramic material.

7. The wind turbine rotor blade according to claim 1, wherein the leading edge member (70) further comprises a third region (82) extending in the spanwise direction adjacent to the first region (78), wherein the boundary (81) between the first and the third region extends in the spanwise direction, wherein the third region is closer to the trailing edge than the first region.

8. The wind turbine rotor blade according to claim 1, wherein a chordwise width (W1, W2) of the leading edge member (70) decreases stepwise towards the tip (14) of the wind turbine rotor blade.

9. The wind turbine rotor blade according to claim 1, wherein the polymer layer is a rubber layer.

10. A method of manufacturing at least a segment of a wind turbine rotor blade according claim 1, the method comprising:

providing a mould having a moulding surface configured for forming at least part of the outer surface of the shell of the wind turbine rotor blade or of the segment of the wind turbine rotor blade, and for forming the electrically conductive outer surface of the leading edge member;

laying a metal film layer onto the moulding surface, optionally followed by one or more additional layers for forming the leading edge member;

laying a fibre material on the metal film layer and the optional additional layers for forming the shell of the wind turbine rotor blade or of the segment of the wind turbine rotor blade; and co-infusing the fibre material, the metal film layer and the optional additional layers with a resin.

11. A wind turbine rotor blade (10) having a pressure side, a suction side, a leading edge, and a trailing edge extending between a tip and a root, wherein the wind turbine rotor blade comprises a lightning protection device (84) and a leading edge member (70), the leading edge member (70) comprising:

an erosion shield (78, 80);

deicing means (118);

an electrically conductive outer surface (80) which is operatively connected to the lightning protection device (84); and a film layer comprising a metal material and a polymer layer, the film layer being bonded on top of the polymer layer, wherein the film layer forms part of the electrically conductive outer surface (80) of the leading edge member (70).

* * * * *